US011113690B2

(12) United States Patent
Woods et al.

(10) Patent No.: US 11,113,690 B2
(45) Date of Patent: Sep. 7, 2021

(54) SYSTEMS AND METHODS FOR PROCESSING DATA MESSAGES FROM A USER VEHICLE

(71) Applicant: MasterCard International Incorporated, Purchase, NY (US)

(72) Inventors: Jeffrey D. Woods, O'Fallon, MO (US); Christopher Eric Mullen, St. Peters, MO (US); Rick Unnerstall, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 497 days.

(21) Appl. No.: 15/388,790

(22) Filed: Dec. 22, 2016

(65) Prior Publication Data

US 2018/0181955 A1 Jun. 28, 2018

(51) Int. Cl.
*G06Q 20/40* (2012.01)
*G06Q 20/38* (2012.01)
*G06Q 20/32* (2012.01)

(52) U.S. Cl.
CPC ....... *G06Q 20/401* (2013.01); *G06Q 20/3224* (2013.01); *G06Q 20/3821* (2013.01);
(Continued)

(58) Field of Classification Search
CPC ....... G06Q 20/18; G06Q 20/3224; G07C 5/20
See application file for complete search history.

(56) References Cited

U.S. PATENT DOCUMENTS 7,136,835 B1 * 11/2006 Flitcroft ................ G06Q 20/00
705/39
8,572,688 B2 10/2013 Radhakrishnan
(Continued)

FOREIGN PATENT DOCUMENTS

DE    102012206770 A1    11/2013
WO    WO-2010083113 A1 * 7/2010 ......... H04L 63/0807

OTHER PUBLICATIONS

P. Urien, M. Pasquet and C. Kiennert, "A breakthrough for prepaid payment: End to end token exchange and management using secure SSL channels created by EAP-TLS smart cards," 2011 International Conference on Collaboration Technologies and Systems (CTS), 2011, pp. 476-483, doi: 10.1109/CTS.2011.5928726 (Year: 2011).*

(Continued)

*Primary Examiner* — Mamon Obeid
*Assistant Examiner* — Jahed Ali
(74) *Attorney, Agent, or Firm* — Armstrong Teasdale LLP

(57) ABSTRACT

A payment processor computing device for performing an electronic transaction initiated by a vehicle is described. The payment processor computing device is configured to receive a registration secure token from a vehicle computing device, the registration secure token corresponding to a cardholder and including an account identifier, a vehicle identifier, and a biometric identifier. The payment processor computing device is further configured to store the registration secure token in memory, receive an authorization request message associated with a payment transaction initiated by the cardholder using the vehicle computing device in communication with a merchant computing device wherein the authorization request message includes a transaction secure token, authenticate the authorization request message by matching the transaction secure token to the registration secure token, embed a matching indicator within the authorization request message, and transmit the authorization request message with the embedded matching indicator to an issuer.

21 Claims, 6 Drawing Sheets

(52) U.S. Cl.
CPC ....... *G06Q 20/405* (2013.01); *G06Q 20/4014* (2013.01); *G06Q 20/40145* (2013.01)

(56) References Cited

U.S. PATENT DOCUMENTS

| | | | | |
|---|---|---|---|---|
| 8,682,802 | B1* | 3/2014 | Kannanari | G06Q 20/367 |
| | | | | 705/64 |
| 8,863,256 | B1 | 10/2014 | Addepalli et al. | |
| 9,262,771 | B1* | 2/2016 | Patel | G06Q 20/325 |
| 9,760,702 | B1* | 9/2017 | Kursun | G06F 21/32 |
| 2004/0214597 | A1 | 10/2004 | Suryanarayana et al. | |
| 2004/0236632 | A1 | 11/2004 | Maritzen et al. | |
| 2006/0184456 | A1* | 8/2006 | de Janasz | G06Q 20/12 |
| | | | | 705/72 |
| 2007/0245152 | A1* | 10/2007 | Pizano | H04L 63/0861 |
| | | | | 713/186 |
| 2009/0117883 | A1* | 5/2009 | Coffing | H04W 4/21 |
| | | | | 455/414.1 |
| 2009/0198617 | A1* | 8/2009 | Soghoian | G06Q 20/04 |
| | | | | 705/65 |
| 2010/0083000 | A1* | 4/2010 | Kesanupalli | G06F 21/32 |
| | | | | 713/186 |
| 2010/0280956 | A1 | 11/2010 | Chutorash et al. | |
| 2011/0060653 | A1* | 3/2011 | King | G06Q 30/02 |
| | | | | 705/14.58 |
| 2011/0136429 | A1* | 6/2011 | Ames | H04B 5/02 |
| | | | | 455/41.1 |
| 2011/0202453 | A1 | 8/2011 | Issa et al. | |
| 2011/0202466 | A1* | 8/2011 | Carter | G06Q 20/20 |
| | | | | 705/67 |
| 2012/0203673 | A1* | 8/2012 | Morgan | H04W 12/06 |
| | | | | 705/27.1 |
| 2013/0085928 | A1* | 4/2013 | McKinney | G06Q 20/20 |
| | | | | 705/39 |
| 2013/0311375 | A1* | 11/2013 | Priebatsch | G06Q 30/06 |
| | | | | 705/44 |
| 2013/0346317 | A1* | 12/2013 | Korkis | G06Q 40/00 |
| | | | | 705/67 |
| 2014/0058805 | A1* | 2/2014 | Paesler | G06Q 20/16 |
| | | | | 705/13 |
| 2014/0143146 | A1* | 5/2014 | Passanha | G06Q 20/40 |
| | | | | 705/44 |
| 2014/0244504 | A1* | 8/2014 | Owen | G06Q 20/06 |
| | | | | 705/44 |
| 2015/0032628 | A1* | 1/2015 | Randall | G06Q 20/40 |
| | | | | 705/44 |
| 2015/0046338 | A1* | 2/2015 | Laxminarayanan | |
| | | | | G06Q 20/38215 |
| | | | | 705/67 |
| 2015/0120472 | A1* | 4/2015 | Aabye | G06Q 20/322 |
| | | | | 705/16 |
| 2015/0127493 | A1* | 5/2015 | Winkelman | G06Q 30/0635 |
| | | | | 705/26.81 |
| 2015/0220917 | A1* | 8/2015 | Aabye | H04L 9/3268 |
| | | | | 705/64 |
| 2015/0317615 | A1* | 11/2015 | Bryant, II | G06Q 20/401 |
| | | | | 705/44 |
| 2016/0012422 | A1* | 1/2016 | Chitilian | G06Q 20/4097 |
| | | | | 705/67 |
| 2016/0253651 | A1* | 9/2016 | Park | G07F 9/023 |
| | | | | 705/39 |
| 2016/0267451 | A1 | 9/2016 | Eid | |
| 2016/0294553 | A1* | 10/2016 | Hattori | H04L 9/14 |
| 2017/0017958 | A1* | 1/2017 | Scott | G06Q 20/40 |
| 2018/0075447 | A1* | 3/2018 | Moreton | G06Q 20/327 |
| 2018/0144322 | A1* | 5/2018 | Unnerstall | G06Q 20/202 |
| 2018/0181955 | A1* | 6/2018 | Woods | G06Q 20/401 |
| 2018/0336738 | A1* | 11/2018 | Gibbs | G07B 15/02 |
| 2018/0349910 | A1* | 12/2018 | Hollmig | G06Q 20/18 |
| 2018/0374278 | A1* | 12/2018 | Mole | G06Q 20/18 |
| 2019/0182042 | A1* | 6/2019 | Ebrahimi | H04L 9/3231 |
| 2019/0228417 | A1* | 7/2019 | Modi | G06Q 20/40145 |
| 2021/0105286 | A1* | 4/2021 | Kuperman | H04L 63/101 |

OTHER PUBLICATIONS

J. Téllez Isaac and Z. Sherali, "Secure Mobile Payment Systems," in IT Professional, vol. 16, No. 3, pp. 36-43, May-Jun. 2014, doi: 10.1109/MITP.2014.40. (Year: 2014).*

A. E. Al-Chalabi, S. Essa, H. Shahzad and I. Damaj, "A wearable and ubiquitous NFC wallet," 2015 IEEE 28th Canadian Conference on Electrical and Computer Engineering (CCECE), 2015, pp. 152-157, doi: 10.1109/CCECE.2015.7129177. (Year: 2015).*

PCT International Search Report and Written Opinion, Application No. PCT/US2017/067162, dated Mar. 14, 2018, 16 pps.

* cited by examiner

SYSTEMS AND METHODS FOR PROCESSING DATA MESSAGES FROM A USER VEHICLE

BACKGROUND

This disclosure relates generally to systems and methods for data processing in computer networks and, more particularly, to network-based systems and methods for processing data messages from a vehicle of a user.

Electronic transaction cards are widely used in the United States and elsewhere as a means to attach financial accounts to financial institutions and, in the case of credit cards, as a medium to create small loans and generate interest income for financial institutions. A user of the transaction card, a cardholder, can initiate an electronic transaction to purchase goods and/or services from a merchant. The merchant processes these transactions using a point-of-sale (POS) device that captures certain transaction information and communicates this information over an interchange network to a merchant bank and ultimately to an issuer. Information is then exchanged between these parties over the interchange network until the transaction is completed.

Some vehicle models include electronic capabilities such as accessing the Internet and accessing satellite navigation systems. These capabilities can be available in vehicles through original equipment manufacturer (OEM) and/or aftermarket user interface devices integrated within the vehicle. Some of the interface devices merge hands-free telephone service with access to Internet/satellite services. Typical electronic capabilities provide pre-set data to the vehicle such as downloadable music. Other electronic capabilities provide directions to a particular location, for example, directions to a merchant's location that provides goods, such as a drive-through restaurant, and/or services, such as a car wash. However, when the cardholder drives these vehicles to the merchant, the cardholder still physically presents the transaction card to the merchant to initiate the electronic transaction. Tasks such as paying for food at the drive-through require the cardholder to hand the transaction card to an employee of the merchant, the employee to process the transaction, and the employee to hand the transaction card back to the cardholder. Sometimes, these time-consuming activities are conducted in inclement weather such as rain, snow, or heat. Additionally, if the cardholder does not have the transaction card in the vehicle (e.g., forgetting the transaction card at home), the cardholder is not able to initiate a transaction with the merchant and purchase goods and/or services.

Accordingly, a system and method is needed that utilizes known protocols for communicating information between vehicle computing devices, merchant computing devices, and payment computing devices in order to enhance and further automate processing transactions and payments.

BRIEF DESCRIPTION

In one embodiment, a payment processor computing device for performing an electronic transaction initiated by a vehicle is provided. The payment processor computing device includes one or more processors in communication with one or more memory devices. The payment processor computing device is configured to receive a registration secure token from a vehicle computing device, wherein the registration secure token corresponds to a cardholder and includes an account identifier, a vehicle identifier, and a biometric identifier, and wherein the cardholder has an account associated with the account identifier for use in processing electronic transactions, the cardholder is associated with a vehicle having the vehicle identifier, and the cardholder is associated with the biometric identifier. The payment processor computing device is further configured to store the registration secure token in the one or more memory devices, receive an authorization request message associated with a payment transaction initiated by the cardholder using the vehicle computing device in communication with a merchant computing device wherein the authorization request message includes a transaction secure token, authenticate the authorization request message by matching the transaction secure token to the registration secure token, embed a matching indicator within the authorization request message, and transmit the authorization request message with the embedded matching indicator to an issuer of the account for further processing.

In another aspect, a computer-implemented method for performing an electronic transaction initiated by a vehicle using a payment processor computing device is provided. The computing device has at least one processor and one or more memory devices. The method includes receiving, by the payment processor computing device, a registration secure token from a vehicle computing device, wherein the registration secure token corresponds to a cardholder and includes an account identifier, a vehicle identifier, and a biometric identifier, and wherein the cardholder has an account associated with the account identifier for use in processing electronic transactions, the cardholder is associated with a vehicle having the vehicle identifier, and the cardholder is associated with the biometric identifier. The method further includes storing by the payment processor computing device the registration secure token in the one or more memory devices, receiving by the payment processor computing device an authorization request message associated with a payment transaction initiated by the cardholder using the vehicle computing device in communication with a merchant computing device wherein the authorization request message includes a transaction secure token, authenticating by the payment processor computing device the authorization request message by matching the transaction secure token to the registration secure token, embedding a matching indicator within the authorization request message, and transmitting the authorization request message with the embedded matching indicator to an issuer of the account for further processing.

In a further aspect, a non-transitory computer readable medium that includes computer executable instructions for performing an electronic transaction initiated by a vehicle using a payment processor computing device in communication with a payment network is provided. When executed by the payment processor computing device, the computer executable instructions cause the payment processor computing device to receive a registration secure token from a vehicle computing device, wherein the registration secure token corresponds to a cardholder and includes an account identifier, a vehicle identifier, and a biometric identifier, and wherein the cardholder has an account associated with the account identifier for use in processing electronic transactions, the cardholder is associated with a vehicle having the vehicle identifier, and the cardholder is associated with the biometric identifier. Other computer executable instructions that cause the payment processor computing device to store the registration secure token in the one or more memory devices, receive an authorization request message associated with a payment transaction initiated by the cardholder using the vehicle computing device in communication with a merchant computing device wherein the authorization request message includes a transaction secure token, authenticate the authorization request message by matching the transaction secure token to the registration secure token, embed a matching indicator within the authorization request message, and transmit the authorization request message with the embedded matching indicator to an issuer of the account for further processing.

BRIEF DESCRIPTION OF THE DRAWINGS

FIG. 1 is a schematic diagram illustrating a multi-party payment system for processing payment transactions using a payment card or payment account in accordance with one embodiment of the present disclosure.

FIG. 2 is a block diagram of an exemplary embodiment of a payment processing system including a vehicle computing device for initiating payment transactions in accordance with one embodiment of the present disclosure.

FIG. 3 is an example configuration of a user computing device operated by a user for use in the payment processing system shown in FIG. 2.

FIG. 4 is an example configuration of a server computing device for use in the payment processing system shown in FIG. 2.

FIG. 5 is a block diagram of a payment processing system showing data flow between various computing devices in accordance with one embodiment of the present disclosure.

FIG. 6 is a flowchart illustrating an exemplary method for using a vehicle computing device when performing a transaction in accordance with one embodiment of the present disclosure.

DETAILED DESCRIPTION

Figure 1:
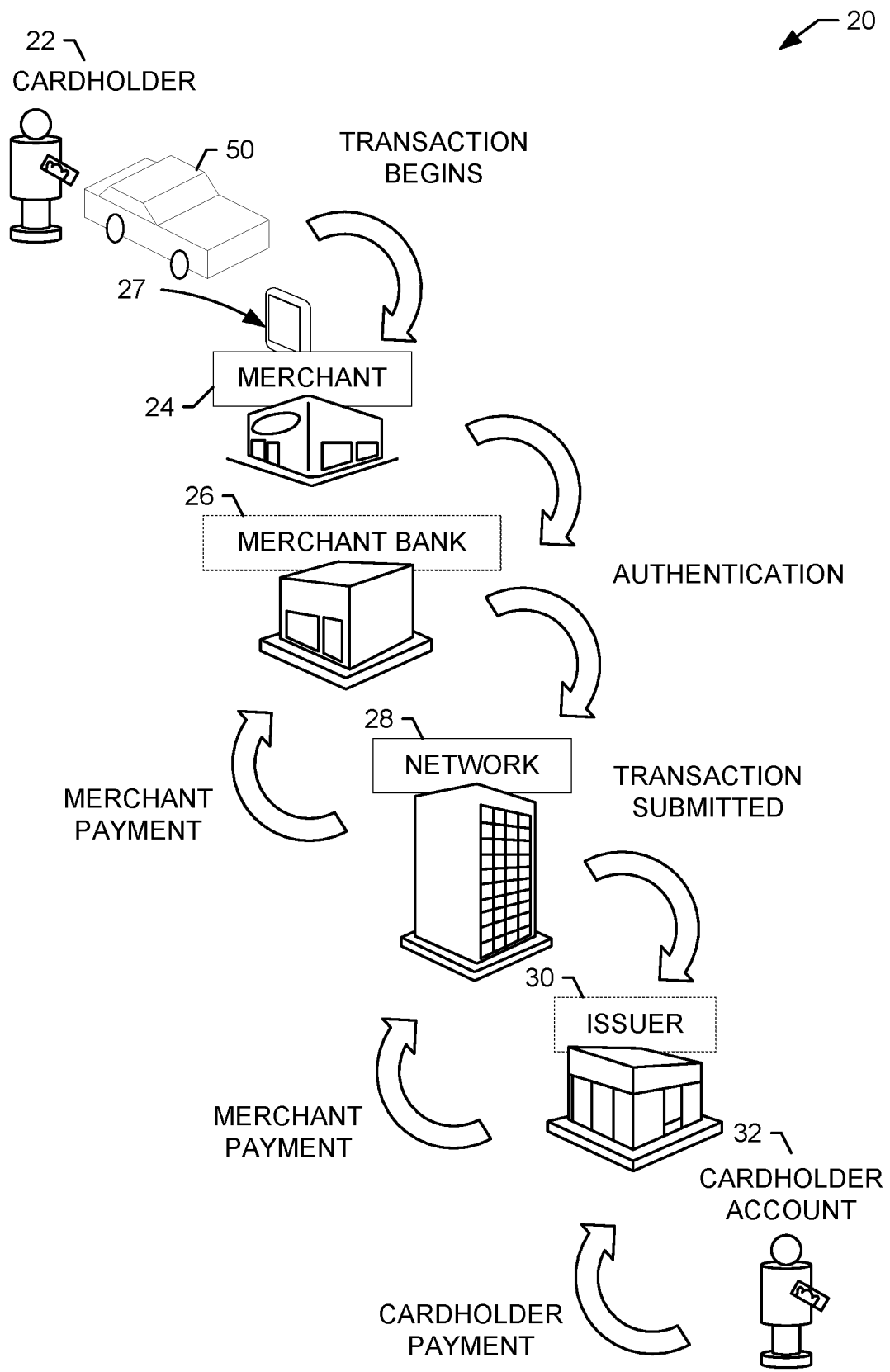
FIGS. 1-6 show exemplary embodiments of the methods and systems described herein.

The methods and systems described herein relate to data processing in a computer network, and more specifically, to processing data messages from a vehicle of a user. The systems and methods further relate to an electronic transaction payment card processing system, such as a payment card processing system using the MasterCard® interchange network (MasterCard is a registered trademark of MasterCard International Incorporated located in Purchase, N.Y.). The MasterCard® interchange network is a proprietary communications standard promulgated by MasterCard International Incorporated® for the exchange of electronic transaction data between financial institutions that have registered with MasterCard International Incorporated®.

The following detailed description illustrates embodiments of the disclosure by way of example and not by way of limitation. It is contemplated that the disclosure has general application to processing electronic transaction data initiated by a vehicle computing device. As used herein, an element or step recited in the singular and proceeded with the word "a" or "an" should be understood as not excluding plural elements or steps, unless such exclusion is explicitly recited. Furthermore, references to "one embodiment" and/or "another embodiment" of the present invention are not intended to be interpreted as excluding the existence of additional embodiments that also incorporate the recited features.

The embodiments described herein are directed to systems and methods for performing a "cardless" transaction using a vehicle computing device through use of a biometric identifier. The transaction is performed by a user of a payment card, referred to herein as a cardholder. A cardholder is issued a payment card by an issuer or an issuing bank. The cardholder is able to use the payment card at participating merchants to initiate transactions. The merchant processes these transactions using a point-of-sale (POS) device (or via a merchant website) that captures certain transaction information and communicates this information over an interchange network (e.g., payment network) to a merchant bank and ultimately to the issuer. Information is then exchanged between these parties over the interchange network until the transaction is completed.

In the example embodiment, before the cardholder initiates a cardless transaction with a merchant, the cardholder may set up or register a vehicle computing device to perform cardless electronic transactions. The transaction is cardless in that the cardholder does not have to physically handle the payment card during a payment transaction. For example, the cardholder receives the payment card from an issuer, and enters registration information into the vehicle computing device to register with a payment processing system that enables the vehicle computing device to electronically initiate cardless payment transactions. Registration information includes, without limitation, payment card information, contact information (e.g., an email address and/or a telephone number), a promotion code, billing information, and/or shipping information. Payment card information may include, for example, a payment card or payment account identifier (e.g., a primary account number (PAN), a partial account number, and/or a card name), a security code, and/or an expiry date. Shipping information may include, for example, a delivery address and/or delivery instructions. In one embodiment, the cardholder enters, among other data inputs, a PAN into the vehicle computing device, and the PAN is stored in vehicle memory (e.g., memory of the vehicle computing device). In another embodiment, the PAN is entered into the vehicle computing device, but is then sent on to a payment processor computing device where it is tokenized, and the token PAN is returned to the vehicle computing device for storage.

Additionally, the cardholder may provide a biometric sample that is to be associated with the other registration information provided that is stored in the vehicle computing device. Biometric samples include, without limitation, a fingerprint image, a voice recording, a retinal image, facial recognition, palm print image, iris recognition, and the like. The biometric sample is unique to the cardholder and difficult to duplicate and/or forge by an unauthorized user. The biometric sample is stored and associated with a biometric identifier. Additionally, the biometric identifier is associated with the stored registration information and facilitates secure authorization of transactions initiated using any of the registration information. A biometric input device in communication with the vehicle computing device may be used for the cardholder to enter the biometric sample. For example, a fingerprint or palm reader/scanner may be located on a steering wheel or on an interactive touch screen, a retinal or iris reader/scanner may be located on a rearview mirror or on a dashboard, and voice reader/recorder may be coupled to an audio system in the vehicle. In some embodiments, the biometric input device is proximate to a driver's seat within the vehicle. In other embodiments, the biometric input device is integral to a cardholder's user computing device (e.g., smart phone, tablet, laptop computer), such that the biometric sample may be uploaded to the vehicle computing device from the cardholder's user computing device.

Moreover, the cardholder may enter vehicle information and/or identifier that corresponds to the vehicle. Vehicle information includes, without limitation, a vehicle identification number (VIN) or any other unique identifier. The vehicle information may be preloaded on the vehicle computing device or may be input by the cardholder. The registration process may further include setting up one or more additional vehicle information systems to provide information during a transaction, such as a vehicle navigation or GPS system (e.g., to provide navigational or location information), a vehicle maintenance system or odometer (e.g., to provide mileage information), a vehicle wireless network (e.g., to provide information regarding connected mobile computing devices, such as a cardholder's smart phone within the vehicle), and/or additional vehicle information systems.

In the example embodiment, the payment account identifier, the biometric identifier, and the vehicle identifier provided during the registration phase are used to create a secure token that is unique to the combination of the cardholder and the vehicle. This secure token is referred to herein as a "registration secure token." The registration secure token is stored at a memory associated with the payment processing system (e.g., in a database accessible to a payment processor) and is used for authentication of payment transactions initiated by the vehicle computing device. The registration secure token is also stored at the vehicle computing device, and is transmitted to and stored in a computing device associated with the issuer. In some embodiments, the vehicle computing device stores registration secure tokens corresponding to more than one cardholder account. For example, a vehicle owner may have more than one cardholder account, or more than one cardholder may drive the vehicle, such as more than one member of a family.

To use the vehicle computing device to initiate a cardless payment transaction, the cardholder drives and/or directs the vehicle to a merchant location. For example, a merchant may provide drive-up or curb-side products and/or services, such as a car wash, a drive-through, and the like. To pay for the merchant's products and/or services, the cardholder connects the vehicle computing device to the merchant's POS device (e.g., directly, such as over a wireless communication link, or over a payment network), and initiates the transaction with the merchant via the vehicle computing device. To initiate the transaction, the cardholder inputs a biometric sample using a biometric input device. The biometric sample is compared to the stored biometric sample and, if the input biometric sample matches the stored biometric sample, the vehicle computing device generates a secure token associated with the payment transaction, referred to herein as a "transaction secure token." The transaction secure token includes the account identifier and vehicle identifier stored at the vehicle computing device. The transaction secure token also includes at least one of the biometric identifier associated with the stored biometric sample and a copy of the input biometric sample. The vehicle computing device provides the transaction secure token to the merchant POS device.

The merchant POS device (and/or another merchant computing device) generates a payment authorization request message (e.g., an ISO 8583 computer message) that includes the transaction secure token, and transmits the payment authorization request message to the payment processing network for further processing.

Upon receipt of the payment authorization request message, a payment processor computing device associated with the payment processing network authenticates the payment authorization request message. More specifically, the payment processor computing device compares the transaction secure token with the stored registration secure token. Upon determining that the transaction secure token included in the payment authorization request message matches the stored registration secure token, the payment processor computing device embeds a matching indicator into the authorization request message. The matching indicator advises the issuer that the received transaction secure token matches the stored registration secure token, and thus, the payment processor computing device has initially verified the payment transaction as being initiated by an authorized cardholder. The matching indicator acts as a flag to the issuer that initial verification of the payment transaction has been performed. In the example embodiment, the issuer may forego one or more additional verification processes and/or may otherwise expedite authorization. In other words, the matching indicator embedded by the payment processor computing device facilitates reducing needless declines, thereby improving network efficiency and network bandwidth, and facilitates improving authorization efficiency by enabling expedited issuer authorization of transactions.

The payment processor computing device transmits the authorization request message with the embedded matching indicator to the issuer for further authorization processing (e.g., authorization or decline). The issuer determines whether the cardholder has sufficient funds to cover the transaction, and may further perform one or more additional authentication and/or verification processes. In some embodiments, upon detection of the embedded matching indicator, the issuer expedites the authentication and/or verification process. If the issuer approves the transaction, the issuer transmits an authorization response message through the payment processing network to the merchant POS device.

However, if the transaction secure token included within the payment authorization request message does not match the stored registration secure token, then the payment processor computing device transmits the authorization request message on to the issuer with a "no-match" indicator embedded therein. The no-match indicator advises the issuer that the received transaction secure token does not match the stored registration secure token, and thus, the payment processor computing device has not verified the payment transaction as being initiated by an authorized cardholder. The issuer may then determine whether to decline the transaction for not being a verified cardholder transaction, or to approve the transaction anyway. Additionally or alternatively, the issuer may use the matching indicator or the no-match indicator embedded in received authorization request messages to update internal fraud-related processes associated with the vehicle and/or the cardholder. For example, if a no-match indicator is received in an authorization request message associated with a particular vehicle, the issuer may initiate additional authentication processes for a predetermined number of subsequent payment transactions initiated using that vehicle. As another example, if a particular cardholder initiates a plurality of payment transactions (e.g., a predetermined number of transactions, e.g., 10 transactions) with a particular merchant, each of which is associated with an authorization request message including a matching indicator, the issuer may expedite and/or forego one or more issuer verification/authentication processes for a subsequent payment transaction initiated by the cardholder at that merchant.

In some embodiments, if the transaction secure token does not match the registration secure token, then the payment processor computing device will automatically generate and transmit an authorization response message back to the merchant that declines the transaction on behalf of the issuer. The decline message includes the "no-match" indicator embedded in the authorization response message. The payment processor computing device may further transmit a notification message to the issuer, notifying the issuer of the declined payment transaction based upon the lack of match between the transaction secure token and the registration secure token.

In some embodiments, the payment processor computing device further verifies the payment authorization request message by applying at least one verification rule and determining that the payment authorization request message is a verified message. For example, in one embodiment, the vehicle computing device retrieves a current location of the vehicle (at the time the payment transaction is initiated) from a vehicle GPS device (or other location system of the vehicle) and transmits the current location of the vehicle to the merchant POS device along with the transaction secure code. The merchant POS device embeds the location of the vehicle into the payment authorization request message. The payment processor computing device compares the location of the vehicle with a location of the merchant (determined, for example, using a look-up table that associates a merchant identifier with a merchant location). The payment authorization request message is verified if it is determined that the current location of the cardholder's vehicle corresponds to the location of the merchant that sent the payment authorization request message. However, if the vehicle location and the merchant location do not correspond, the payment authorization request message is rejected or declined. In another example, the vehicle computing device retrieves a current mileage of the vehicle (at the time the payment transaction is initiated) from an odometer of the vehicle and transmits the current mileage to the merchant POS device along with the transaction secure code. The merchant POS device embeds the mileage of the vehicle into the payment authorization request message. The payment processor computing device compares the current mileage of the vehicle with a previous mileage of the vehicle (determined, for example, using a look-up table that stores vehicle mileage received during previous authorized payment transactions). The payment authorization request message is verified if it is determined that the current mileage of the cardholder's vehicle is greater than a previous mileage of the vehicle corresponding to a previous transaction. However, if the current mileage of the vehicle is less than a previous transaction's mileage then the payment authorization request is rejected or declined.

In yet another example, the cardholder registers one or more user computing devices (e.g., a smart phone) with the payment processing system, such that the user computing device is associated with the cardholder. For instance, the cardholder may provide an identifier of the user computing device that is subsequently verified by the payment processing system, such as a phone number or other unique identifier. When a payment transaction is initiated using the vehicle computing device, the vehicle computing device may further transmit the identifier of any user computing devices that are connected to a wireless network of the vehicle (e.g., a Bluetooth® network or a mobile "hot-spot") to the merchant POS. The merchant POS embeds the user computing device identifier into the payment authorization request message. The payment processor computing device compares the user computing device identifier with any stored user computing device identifier(s) registered by the cardholder with the payment processing system. The payment authorization request message is verified if it is determined that the user computing device identifier in the payment authorization request message matches a stored user computing device identifier. If no user computing device identifier is embedded in the payment authorization request message and/or if non-stored user computing device identifier(s) are embedded, the payment authorization request message may not be declined, but additional authentication and/or verification processes may be initiated.

In other embodiments, the payment processor computing device receives coupons from a merchant. The payment processor computing device identifies one or more cardholders and/or corresponding vehicles that have a prior transaction history with the merchant and distributes the coupons to the vehicle computing device, to be used in a future transaction with the merchant. As such, the payment processor computing device facilitates transmitting merchant coupons to the cardholder and the vehicle computing device for use in future merchant transactions.

The methods and systems described herein may be implemented using computer programming or engineering techniques including computer software, firmware, hardware or any combination or subset thereof, wherein the technical effect is achieved by performing at least one of: (a) registering by a cardholder with the payment processor computing device, which may include downloading an app (e.g., computer application that includes computer-implemented instructions) that enables the cardholder's vehicle computing device to communicate with a merchant computing device (e.g., POS device); (b) inputting payment information into the vehicle computing device or a client computing device to register the vehicle for initiating payment transactions, the payment information includes, without limitation, payment card information, contact information (e.g., an email address and/or a telephone number), a promotion code, billing information, and/or shipping information, wherein the payment card information may include, for example, a card identifier (e.g., a primary account number (PAN), a partial account number, and/or a card name), a security code, and/or an expiry date, and wherein the PAN or a tokenized PAN is stored in the vehicle memory; (c) inputting an input biometric sample of the cardholder for storing in the vehicle computing device or at the payment processor computing device, the biometric information including, without limitation, a fingerprint image, a voice recording, a retinal image, facial recognition, palm print image, iris recognition, and the like; (d) positioning the vehicle having the vehicle computing device in close proximity to the merchant's location (e.g., the merchant may provide drive up or curb side products and/or services); (e) initiating the transaction by inputting a biometric input of the transaction initiator into the vehicle computing device; (f) comparing the biometric input to the biometric sample stored in the system to verify the initiator of the transaction as the actual cardholder; (g) if the biometric input matches the biometric sample stored in the system, then the vehicle computing device generates a secure token for the transaction and transmits it to the merchant computing device (e.g., POS device), wherein the secure token is unique to the cardholder and includes an account identifier, a vehicle identifier, and a biometric identifier; (h) generating, by the merchant computing device, a payment authorization request message (e.g., ISO 8583 computer message) for the transaction that includes the secure token, transmitted from the cardholder via the vehicle computing device, and the transaction data for the transaction; (i) upon receipt of the payment authorization request message, the payment processor computing device authenticates the payment authorization request message by determining that the secure token sent with the payment authorization request message matches a stored secure token corresponding to the cardholder that was created as part of the registration; (j) if the secure token from the payment authorization request message matches the stored secure token at the payment processor computing device, embedding, by the payment processor computing device, a matching indicator into the authorization message (e.g., ISO 8583 message) advising the issuer that the received secure token matches the stored secure token, and thus, the transaction has been initially verified as being initiated by the authorized cardholder; (k) if, however, the secure token included within the payment authorization request message does not match the stored secure token at the payment processor computing device, either (1) embedding, by the payment processor computing device, a "no match" indicator into the authorization request message so that the issuer can decline the transaction for not being a verified cardholder transaction, or (2) automatically declining, by the payment processor computing device, the transaction on behalf of the issuer; and (l) transmitting, from the payment processor computing device to the merchant, an authorization response message authorizing the transaction if the received secure token matches the stored secure token.

The systems and methods described herein provide the technical advantages of at least one of: (a) enabling communication between a merchant computing device and a vehicle computing device for facilitating an electronic transaction; (b) enabling electronic transactions initiated by a user using a vehicle computing device; (c) initiating a payment transaction using a vehicle computing device by inputting a biometric input that is compared to a stored biometric sample for authenticating the user as the authentic cardholder; (d) enabling biometric authentication of a cardholder to initiate a payment transaction from a vehicle computing device without the cardholder having to leave the vehicle; (e) verifying electronic transactions via data supplied by the user's vehicle; (f) creating, as part of the registration process, a registration secure token at the vehicle computing device that is unique to the cardholder and includes an account identifier, a biometric identifier, and a vehicle identifier, wherein the registration secure token is stored at the payment processor computing device, and wherein each time a payment transaction is initiated by the cardholder using the vehicle computing device a transaction secure token is generated by the vehicle computing device so that it can be matched to the stored (registration) secure token to confirm that the authentic cardholder is the one initiating the transaction; (g) expediting issuer authentication/verification processing by embedding a matching indicator in an authorization request message that indicates initial verification has already been performed, thereby decreasing network latency; (h) improving network efficiency and bandwidth by reducing needless issuer declines using matching indicators to improve issuer fraud processing; and/or (i) improving issuer fraud processes using matching/no-match indicators to identify low- or high-risk cardholders and/or vehicles.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

The systems and processes described herein are not limited to the specific embodiments described herein. In addition, components of each system and each process can be practiced independent of and separate from other components and processes described herein. Each component and process also can be used in combination with other assembly packages and processes.

The following detailed description illustrates embodiments of the disclosure by way of example and not by way of limitation. It is contemplated that the disclosure has general application to processing electronic transaction data initiated by a vehicle computing device in industrial, commercial, and residential applications.

FIG. 1 is a schematic diagram illustrating a multi-party payment card processing system 20 for processing payment card transactions in accordance with one exemplary embodiment of the disclosure. In the exemplary embodiment, the payment card system 20 relates to a system, such as a payment card system using the MasterCard® payment system. The MasterCard® payment system is a proprietary communications standard promulgated by MasterCard International Incorporated® for the exchange of financial transaction data between financial institutions that are members of MasterCard International Incorporated®.

In the example payment card system 20, a financial institution such as an issuer 30 issues a payment card, such as a credit card account or a debit card account, to a cardholder 22, who uses the payment card to tender payment for a purchase from a merchant 24. More particularly, cardholder 22 enters payment card information, along with additional registration information, into a vehicle computing device of a vehicle 50. Where reference is made to vehicle 50 performing one or more actions, it should be understood that the vehicle computing device 102 (shown in FIG. 2) may perform such actions. Vehicle 50 generates and transmits a registration secure token, which includes an account identifier (which may itself be tokenized), a vehicle identifier (e.g., a VIN), and a biometric identifier (associated with a biometric sample provided by cardholder 22 during registration). Vehicle 50 transmits the registration secure token to a payment processor computing device (not shown in FIG. 1) associated with a payment processing network 28, where the registration secure token is stored. During a purchase transaction, cardholder 22 inputs a biometric sample to vehicle 50, which is compared with a stored biometric sample. If the biometric samples match, vehicle 50 transmits a transaction secure token including the biometric identifier, the account identifier, and the vehicle identifier to merchant 24.

To accept payment with the payment card, merchant 24 must normally establish an account with a financial institution that is part of the financial payment system. This financial institution is usually called the "merchant bank" or the "acquiring bank" or "acquirer." In the example embodiment, when cardholder 22 tenders payment for a purchase with a payment card, merchant 24 requests authorization from merchant bank 26 for the amount of the purchase. The request may be performed over the telephone, but is usually performed through the use of a point-of-sale (POS) terminal 27 (or via a merchant website), which reads the cardholder's account information from a magnetic stripe, a chip, embossed characters, and the like, included on the payment card and communicates electronically with the transaction processing computers of merchant bank 26. In the example embodiment, POS terminal 27 communicates with vehicle 50 to receive the transaction secure token. POS terminal 27 generates an authorization request message including the transaction secure token and transmits the authorization request message to network 28. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

The payment processing computing device of network 28 performs an initial authentication or verification of the payment transaction by comparing the transaction secure token with the registration secure token. If the tokens match, network 28 will embed a matching indicator within the authorization request message and will transmit the authorization request message to issuer bank 30, which determines whether a cardholder's account 32 is in good standing and whether the purchase is covered by the cardholder's available credit line or account balance. Based on these determinations as well as the matching indicator (or, alternatively, the receipt of an authorization request message including an embedded no-match indicator), the request for authorization will be declined or accepted. If the request is accepted, an authorization code may be issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-sale terminal. If a cardholder cancels a transaction before it is captured, a "void" is generated. If a cardholder returns goods after the transaction has been captured, a "credit" is generated. For debit card transactions, when a request for a PIN authorization is approved by the issuer, the cardholder's account 32 is decreased. Normally, a charge is posted immediately to cardholder's account 32. The bankcard association then transmits the approval to the acquiring processor for distribution of goods/services, or information or cash in the case of an ATM. After a transaction is captured, the transaction is settled between merchant 24, merchant bank 26, and issuer 30. Settlement refers to the transfer of financial data or funds between the merchant's account, merchant bank 26, and issuer 30 related to the transaction. Usually, transactions are captured and accumulated into a "batch," which is settled as a group.

Figure 2:
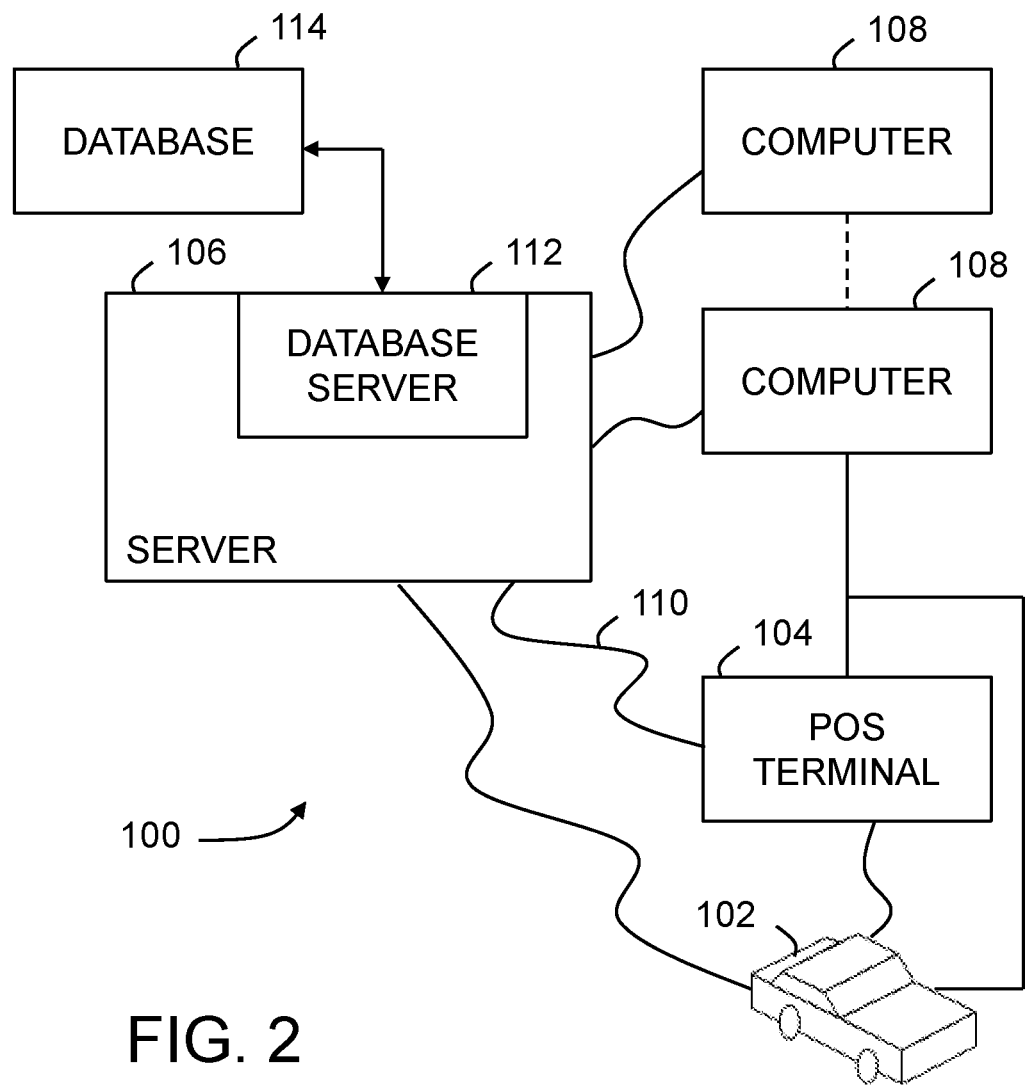

FIG. 2 is a block diagram of an exemplary payment processing system 100 including a vehicle computing device 102 (which may be included in vehicle 50, shown in FIG. 1) in accordance with one embodiment of the present disclosure. System 100 can be utilized by cardholders, for example cardholder 22 shown in FIG. 1, as part of a process of initiating an electronic transaction to purchase goods and/or services (collectively an "item") as described below. In addition, system 100 is a payment card account including vehicle computing device 102, which a cardholder may use to connect to a merchant's point-of-service (POS) terminal 104, and/or conduct electronic transactions without the cardholder having to leave the vehicle.

More specifically, in the example embodiment, system 100 includes a server system 106, which is a type of computing device, and a plurality of sub-systems (also referred to as client systems 108) connected to server system 106. In one embodiment, client systems 108 are computing devices that includes a web browser and a memory device, such that server system 106 is accessible to client systems 108 using a network 110. In one embodiment, server system 106 may be associated with the payment processor and may be the payment processor computing device. Network 110 may include the Internet and/or one or more other networks. For example, client systems 108 are interconnected through a wireless network, a wired network, a telephone network, a cable network, a combination thereof, and the like. Examples of a wireless network include networks such as WiFI, WiMAX, WiBro, local area network (LAN), personal area network (PAN), metropolitan area network, cellular, Bluetooth and the like. Client systems 108 may be any computing device capable of interconnecting to the Internet including a smart phone, laptop, desktop, tablet, wearable device (e.g., a "smart watch"), and/or any other computing device.

System 100 also includes POS terminals 104, which are connected to client systems 108 through network 110 and may be connected to server system 106 through network 110. POS terminals 104 are interconnected to the Internet through many interfaces including a network, such as a local area network (LAN) or a wide area network (WAN), dial-in-connections, cable modems, wireless modems, and special high-speed ISDN lines. POS terminals 104 may be any device capable of interconnecting to the Internet and including an input device capable of reading information from a cardholder's payment card and/or from vehicle computing device 102. POS terminal 104 may also include a website associated with a merchant that is hosted by a computing device for display on the vehicle computing device 102 or on one of client devices 108.

A database server 112 is connected to a database 114, which contains information on a variety of matters, as described below in greater detail. In one embodiment, centralized database 114 is stored on server system 106 and can be accessed by cardholders at one of client systems 108 by logging onto server system 106 through one of client systems 108. In an alternative embodiment, database 114 is stored remotely from server system 106 and may be non-centralized. Database 114 may store transaction data generated as part of sales activities conducted over the bankcard network including data relating to merchants, account holders or customers, and purchases. Database 114 may also store account data including at least one of a cardholder name, a cardholder address, an account number, and other account identifiers. Database 114 may also store merchant data including a merchant identifier that identifies each merchant registered to use the payment account card network, and instructions for settling transactions including merchant bank account information. Database 114 may also store PAN numbers (or tokenized versions of the PANs) or bank account numbers for various parties including merchants and customers, along with payment account identifiers such as secure tokens, biometric identifiers, and other data necessary to implement the system and processes described herein.

System 100 also includes vehicle computing device 102, which is configured to communicate with at least one of POS terminal 104, client systems 108, and server system 106. In one embodiment, vehicle computing device 102 is associated with or controlled by a cardholder making a purchase using a payment card account and payment processing system 100. In the exemplary embodiment, vehicle computing device 102 is a component of a vehicle (e.g., vehicle 50) such as an on-board computing device. In other embodiments, vehicle computing device 102 is a computing device communicatively coupled to a vehicle such as a smart phone, laptop, desktop, tablet, wearable device, and/or any other computing device capable of interconnecting to the Internet. Vehicle computing device 102 is interconnected to the Internet through many interfaces including a network, such as a LAN or a WAN, dial-in-connections, cable modems, wireless modems, and special high-speed ISDN lines. Vehicle computing device 102 is configured to communicate with POS terminal 104 using various outputs including, for example, Bluetooth communication, radio frequency communication, near field communication, network-based communication, and the like.

In the example embodiment, one of client systems 108 may be associated with an acquirer, a cardholder, or a customer; while another one of client systems 108 may be associated with an issuer; POS terminal 104 may be associated with a merchant; vehicle computing device 102 may be associated with a cardholder or a customer; and server system 106 may be associated with a payment network or an interchange network (e.g., network 28, shown in FIG. 1).

In the example embodiment, server system 106 may be associated with a payment network, and may be referred to as a payment processor computing device. Server system 106 may be used for processing transaction data. In addition, at least one of client systems 108 may include a computer system associated with an issuer of a transaction card. Accordingly, server system 106 and client systems 108 may be utilized to process transaction data relating to purchases made by a cardholder utilizing a transaction card that is processed by the payment network and issued by the associated issuer. Another client system 108 may be associated with a user or a cardholder seeking to register access information or process a transaction with at least one of the payment network, the issuer, the POS terminal 104, or the merchant computer.

The embodiments illustrated and described herein as well as embodiments not specifically described herein but within the scope of aspects of the invention constitute exemplary means for performing an electronic transaction, and more particularly, constitute exemplary means for performing an electronic transaction using vehicle computing device 102. For example, server system 106, POS terminal 104, client system 108, vehicle computing device 102, or any other similar computing device, programmed with computer-executable instructions to execute processes and techniques with a processor as described herein, constitutes exemplary means for enabling a cardholder to execute an electronic transaction with a merchant.

Figure 3:
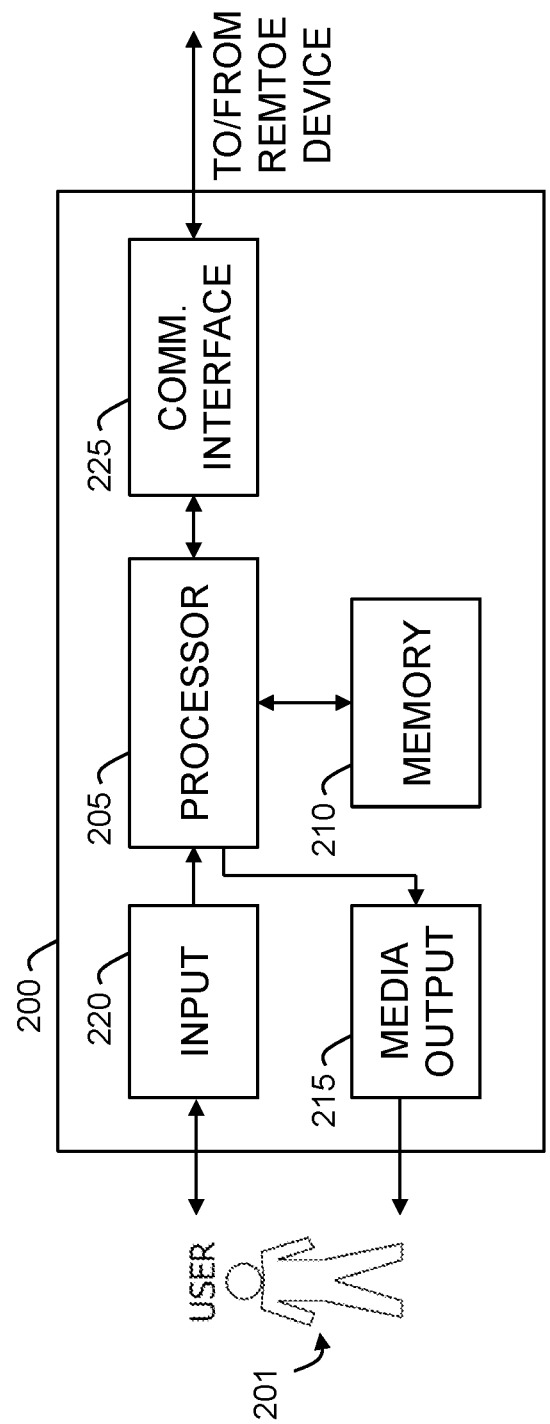

FIG. 3 is an example configuration of a user computing device 200 operated by a user 201 for use in the payment processing system 100 (shown in FIG. 2). User computing device 200 may include, but is not limited to, client systems 108, point-of-service (POS) terminal 104, and vehicle computing device 102 (all shown in FIG. 2).

User computing device 200 includes a processor 205 for executing instructions. In some embodiments, executable instructions are stored in a memory area 210. Processor 205 may include one or more processing units (e.g., in a multi-core configuration) for executing instructions. Memory area 210 is any device allowing information such as executable instructions and/or other data to be stored and retrieved. Memory area 210 may include one or more computer readable media.

User computing device 200 also includes at least one media output component 215 for presenting information to user 201. Media output component 215 is any component capable of conveying information to user 201. For example, media output component 215 includes an output adapter such as a video adapter and/or an audio adapter. The output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). Stored in memory area 210 are, for example, computer readable instructions for providing a user interface to user 201 via media output component 215.

Additionally, user computing device 200 includes an input device 220 for receiving input from user 201. For example, user 201 may use input device 220 to enter account identifiers, vehicle identifiers, and/or biometric identifiers. Input device 220 may include, for example, a keyboard, a pointing device, a mouse, a stylus, a touch sensitive panel (e.g., a touch pad or a touch screen), a gyroscope, an accelerometer, a position detector, an audio input device, a fingerprint reader/scanner, a palm print reader/scanner, a iris reader/scanner, a retina reader/scanner, a profile scanner, and the like. A single component, such as a touch screen, may function as both an output device of media output component 215 and input device 220. In other embodiments, input device 220 may be commutatively coupled to user computing device 200 and located at a remote position. For example, vehicle computing device 102 may be coupled to input device 220 that includes a fingerprint reader/scanner positioned on a steering wheel. In another example, vehicle computing device 102 may be coupled to input device 220 that includes a retina reader/scanner positioned on a rear view mirror.

User computing device 200 may also include a communication interface 225, which is communicatively couplable to a remote device such as server system 106 (shown in FIG. 2) and/or POS terminal 104. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable cardholders, such as user 201, to display and interact with media and other information typically embedded on a web page or a website from server system 106. A client application allows user 201 to interact with a server application from server system 106.

In general during a transaction, the cardholder as user 201 drives and/or directs a vehicle including user computing device 200, such as vehicle computing device 102, to the merchant's location. To purchase the merchant's products and/or services, user 201 connects (e.g., directly or over the payment network) vehicle computing device 102 to the merchant's user computing device 200, such as through POS terminal 104, and initiates the electronic transaction. To initiate the transaction, user 201 inputs via input device 220 a biometric sample at the beginning of the transaction. Vehicle computing device 102 generates a transaction secure token including a biometric identifier of the biometric sample and/or the biometric sample itself and transmits the transaction secure token to POS terminal 104 from vehicle computing device 102.

More specifically, user 201 initiates the transaction by inputting a biometric input into vehicle computing device 102; vehicle computing device 102 compares the biometric input to a stored biometric sample to verify user 201 (and the initiator of the transaction) as the actual cardholder 22; if the biometric input matches the stored biometric sample, then vehicle computing device 102 generates a transaction secure token for the transaction and transmits it to POS terminal 104; POS terminal 104 then generates a payment authorization request message for the transaction that includes the transaction secure token along with other transaction data for sending to payment processor computing device 106 (shown in FIG. 2) for further processing described below.

Figure 4:
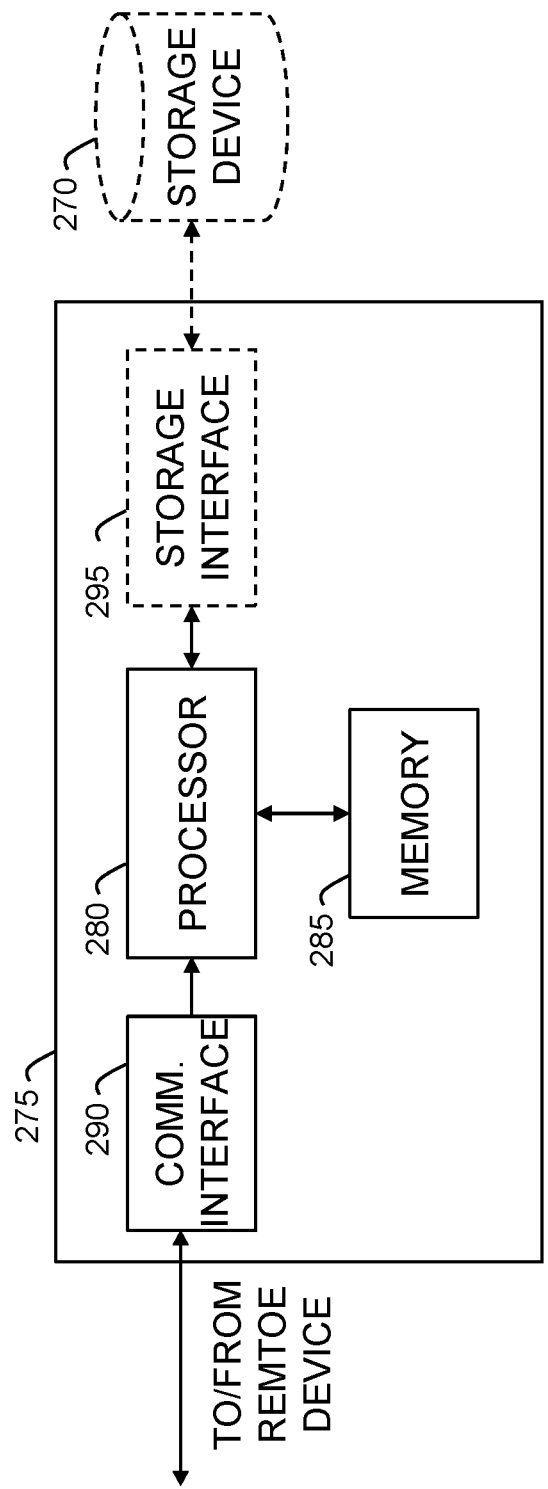

FIG. 4 is an example configuration of a server computing device 275, such as server system 106 and/or database server 112, for use in payment processing system 100 (all shown in FIG. 2). Server computing device 275 includes a processor 280 for executing instructions. Instructions may be stored in a memory area 285, for example. Processor 280 may include one or more processing units (e.g., in a multi-core configuration) for executing instructions. The instructions may be executed within a variety of different operating systems on server computing device 275, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages).

Processor 280 is operatively coupled to a communication interface 290 such that server computing device 275 is capable of communicating with a remote device such as user computing device 200 (shown in FIG. 3) or another server computing device 275. For example, communication interface 290 may receive requests from client systems 108, point-of-service (POS) terminal 104, and/or vehicle computing device 102 via the Internet, as illustrated in FIG. 2. Communication interface 290 may include, for example, a transceiver, a transmitter, a receiver, and Ethernet communication interface, an RS-485/EIA-485 communication interface, a GPM communications interface, a programmable logic controller, an RS-322 communication interface, and/or any other communication interface device and/or component.

Processor 280 may also be operatively coupled to a storage device 270. Storage device 270 is any computer-operated hardware suitable for storing and/or retrieving data. In some embodiments, storage device 270 is integrated in server computing device 275. For example, server computing device 275 may include one or more hard disk drives as storage device 270. In other embodiments, storage device 270 is external to server computing device 275 and may be accessed by a plurality of server computing devices 275. For example, storage device 270 may include multiple storage units such as hard disks or solid state disks in a redundant array of inexpensive disks (RAID) configuration. Storage device 270 may include a storage area network (SAN) and/or a network attached storage (NAS) system.

In some embodiments, processor 280 is operatively coupled to storage device 270 via a storage interface 295. Storage interface 295 is any component capable of providing processor 280 with access to storage device 270. Storage interface 295 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 280 with access to storage device 270.

Memory area 285 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In general, upon receipt of a payment authorization request message from the merchant, server computing device 275 (e.g., payment processor computing device 106) authenticates the payment authorization request message. More specifically, the server computing device 275 determines that a transaction secure token sent with the payment authorization request message matches a stored registration secure token corresponding to the cardholder that was created as part of a registration process.

If the transaction secure token matches the registration secure token, then server computing device 275 embeds a matching indicator into the authorization request message, the matching indicator advising the issuer that the transaction secure token matches the registration secure token, and thus, the transaction has been initially verified as being initiated by the authorized cardholder. If, however, the transaction secure token does not match the registration secure token, then server computing device 275 may either (i) embed a "no match" indicator within the authorization request message so that the issuer can better determine whether to decline the transaction for not being initiated by the verified cardholder, or (2) automatically decline the transaction on behalf of the issuer. Server computing device 275 is also configured to transmit an authorization response message authorizing the transaction if the transaction secure token matches the registration secure token and the issuer authorizes the transaction, or declining the transaction if the received secure token does not match the stored secure token and/or the issuer does not authorize the transaction.

Figure 5:
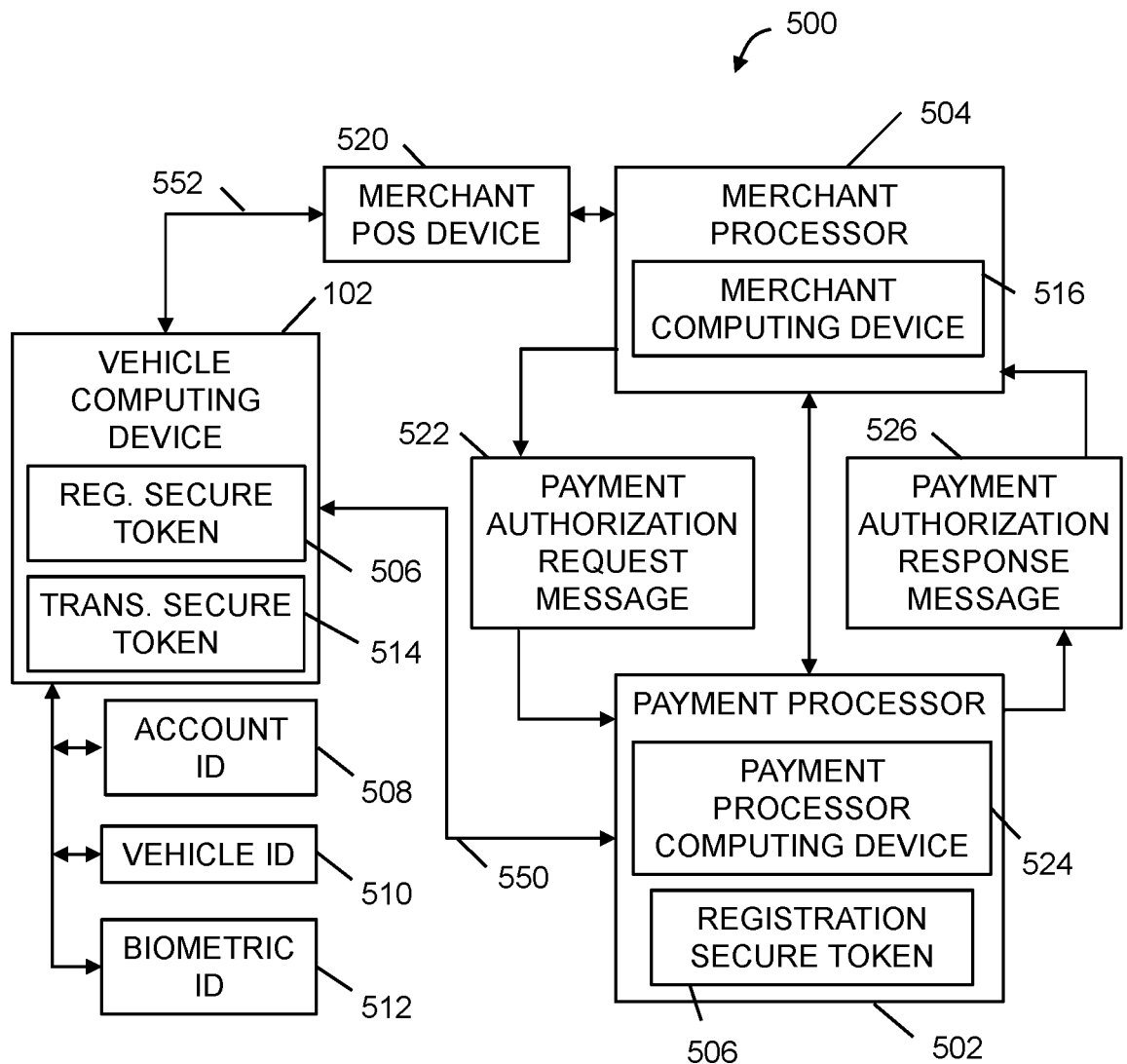

FIG. 5 is a block diagram of a payment processing system 500 showing data flow among vehicle computing device 102

(shown in FIG. 2), a payment processor 502, and a merchant processor 504. In the exemplary embodiment, system 500 may be a payment processing system such as system 100 (shown in FIG. 2). In some embodiments, payment processor 502 may be integral to or in communication with an interchange network, such as interchange network 28 (shown in FIG. 1). Vehicle computing device 102 enables a cardholder to access payment processor 502 and merchant processor 504 and electronically transact with payment processor 502 and/or merchant processor 504 to purchase items/services associated with a merchant. In the exemplary embodiment, vehicle computing device 102 is coupled to and/or integral to a vehicle, such as, but not limited to, an automobile, a truck, a recreational vehicle, a motorcycle and a marine vessel.

At the time the cardholder registers with payment processor 502, the cardholder inputs a biometric sample that is stored at vehicle computing device 102 or at payment processor 502. Vehicle computing device 102 uses the biometric sample, associated with a biometric identifier 512, along with other data to generate a registration secure token 506 that gets stored at the payment processor 502. More specifically, vehicle computing device 102 is configured to generate registration secure token 506 that includes an account identifier 508, a vehicle identifier 510, and a biometric identifier 512. Account identifier 508, vehicle identifier 510, and biometric identifier 512 are all input to vehicle computing device 102 (e.g., by a cardholder such as cardholder 22, shown in FIG. 1) during the registration process. Account identifier 508 is specific to each cardholder and may include, without limitation, payment card information, contact information (e.g., an email address and/or a telephone number), a promotion code, billing information, and/or shipping information. Payment card information may include, for example, a card identifier (e.g., a primary account number (PAN), a tokenized PAN, a partial account number, and/or a card name), a security code, and/or an expiry date. Shipping information may include, for example, a delivery address and/or delivery instructions. Different vehicles are assigned unique vehicle identifiers 510 to associate the transactions to the particular vehicle. Regardless of which cardholder and account identifiers 508 are used to purchase the good and/or service, the purchased item is associated with the vehicle via vehicle identifier 510. Vehicle identifier 510 may include, without limitation, a vehicle identification number (VIN) or any other unique identifier. Vehicle identifier 510 may be preloaded on the vehicle computing device or may be input by the cardholder. Additionally, biometric identifier 512 may be associated with and/or include a biometric sample such as, without limitation, a fingerprint image, a voice recording, a retinal image, facial recognition, palm print image, iris recognition, and the like, or hashed biometric data where a hashing function is applied to biometric data. Biometric identifier 512 is unique to the cardholder and difficult to duplicate and/or forge by an unauthorized user. Biometric identifier 512 is associated with account identifier 508 and vehicle identifier 510 and facilitates secure authorization of transactions initiated using vehicle computing device 102. In some embodiments, vehicle computing device 102 is able to generate registration secure tokens 506 corresponding to more than one cardholder account. For example, a vehicle owner may have more than one cardholder account registered with the system, or more than one cardholder may drive the vehicle, such as in the case of a family using the vehicle.

Registration secure token 506 is unique to the cardholder and is used to authenticate transactions initiated at vehicle computing device 102. Registration secure token 506 is stored in vehicle computing device 102, and is also transmitted 550 to payment processor 502. Payment processor 502 stores registration secure token 506.

Each time the cardholder initiates a transaction from vehicle computing device 102, the cardholder inputs a biometric input that gets compared to the stored biometric sample. If it matches, vehicle computing device 102 generates a transaction secure token 514 including the biometric identifier 512, account identifier 508, and vehicle identifier 510.

Transaction secure token 514 is communicated 552 to merchant processor 504. Merchant processor 504 includes a merchant computing device 516. In the example embodiment, merchant computing device 516 may be a computing device such as user computing device 200 (shown in FIG. 3). Merchant computing device 516 is a service-provider device that is communicatively coupled to merchant processor 504. Merchant computing device 516 facilitates communication 552 of transaction data from vehicle computing device 102 to payment processor 502. Specifically, a merchant point-of-service (POS) device 520 facilitates conducting a payment transaction and receiving transaction secure token 514, after the cardholder initiates the payment transaction, from vehicle computing device 102 via a wireless transmission such as near field transmission or Bluetooth transmission. When merchant processor 504 receives transaction data including transaction secure token 514, merchant computing device 516 generates a payment authorization request message 522 including transaction secure token 514. Payment authorization request message 522 is transmitted to payment processor 502, specifically to a payment processor computing device 524, for processing and further transmission to an issuing bank for approval.

Upon receipt of payment authorization request message 522, payment processor computing device 524 authenticates payment authorization request message 522 by determining that transaction secure token 514 sent with payment authorization request message 522 matches registration secure token 506 corresponding to the cardholder that was created as part of the registration process. If transaction secure token 514 matches registration secure token stored at payment processor computing device 524, then payment processor computing device 524 embeds a matching indicator into authorization request message 522. The matching indicator advises the issuer that transaction secure token 514 matches registration secure token 506, and thus, the transaction has been initially verified as being initiated by the authorized cardholder. If, however, transaction secure token 514 does not match registration secure token 506, then payment processor computing device 524 is configured to either (i) embed a "no match" indicator into authorization request message 522 so that the issuer can decline the transaction for not being from the verified cardholder, or (2) automatically decline the transaction on behalf of the issuer. Payment processor computing device 524 is also configured to transmit to merchant processor 504 an authorization response message 526 authorizing the transaction, if transaction secure token 514 matches registration secure token 506 and the issuer approves the transaction.

Payment processor computing device 524 is used for processing the merchant transactions. In one embodiment, payment processor computing device 524 includes an interchange computer associated with an interchange network. Payment authorization response message 526 is received from the issuing bank and transmitted to merchant computing device 516 by payment processor computing device 524.

In one embodiment, upon receipt of payment authorization request message 522, payment processor computing device 524 authenticates payment authorization request message 522. More specifically, payment processor computing device 524 determines that transaction secure token 514 included in payment authorization request message 522 matches registration secure token 506 corresponding to the cardholder. If transaction secure token 514 matches registration secure token 506, a confirmation response message (not shown) indicating that the transaction is undergoing issuer authorization is sent to merchant computing device 516. However, if transaction secure token 514 does not match registration secure token 506, a rejection response message (not shown) declining the transaction on behalf of the issuer is sent to merchant computing device 516.

In some embodiments, payment processor computing device 524 further verifies payment authorization request message 522 by applying at least one verification rule and determining that payment authorization request message 522 is a verified message. For example, payment authorization request message 522 is verified if it is determined that a current location of the cardholder's vehicle as sent by vehicle computing device 102 corresponds to a location of merchant POS device 520 provided by merchant computing device 516. If the vehicle location and the merchant location correspond then payment authorization request message 522 is verified. However, if the vehicle location and the merchant location do not correspond then payment authorization request message 522 is rejected. In another example, payment authorization request message 522 is verified if it is determined that a current mileage of the cardholder's vehicle as sent by vehicle computing device 102 is greater than a previous mileage of the vehicle corresponding to a previous transaction. If the current mileage of the vehicle is greater than a previous transaction's mileage then payment authorization request 522 is verified. However, if the current mileage of the vehicle is less than a previous transaction's mileage then payment authorization request 522 is rejected.

In other embodiments, payment processor computing device 524 may receive coupons from merchants and merchant computing device 516 with prior transaction history to distribute to the cardholder (specifically, to vehicle computing device 102) and to be used in any future transactions with the merchant. As such, payment processor computing device 524 also facilitates transmitting merchant coupons to the cardholder and vehicle computing device 102 for use in future merchant transactions.

Figure 6:
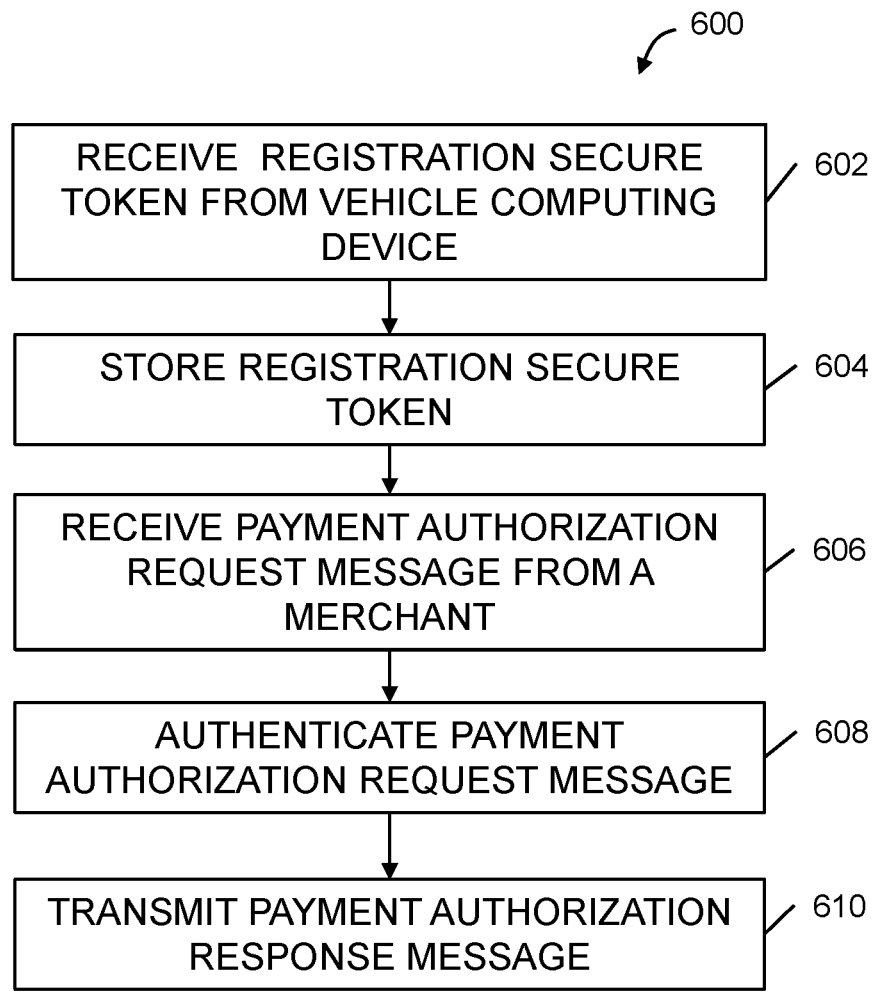

FIG. 6 is a flowchart illustrating an exemplary method 600 for using a vehicle computing device, such as vehicle computing device 102 (shown in FIG. 2), when performing an electronic transaction in accordance with one embodiment of the present invention. In one embodiment, method 600 may be implemented by system 100 (shown in FIG. 2). In the exemplary embodiment, method 600 relates to the receiving and transmitting of messages and information among vehicle computing device 102, merchant computing device 516, and payment processor computing device 524 (all shown in FIG. 5). While operations within the method 600 are described below with regard to particular devices and/or systems, method 600 may be implemented on other such devices and/or systems by one skilled in the art.

During operation, payment processor computing device 524 receives 602 a registration (or first) secure token from vehicle computing device 102. The registration secure token corresponds to a cardholder and includes an account identifier, such as account identifier 508, a vehicle identifier, such as vehicle identifier 510, and a biometric identifier, such as biometric identifier 512 (all shown in FIG. 5). The registration secure token is then stored 604 by payment processor computing device 524. When the cardholder initiates an electronic transaction with a merchant, payment processor computing device 524 receives 606 a payment authorization request message, such as message 522, generated from merchant computing device 516. The payment authorization request message includes a transaction (or second) secure token, such as token 506, received from vehicle computing device 102 by merchant computing device 516 when the cardholder inputs the biometric identifier and initiates the electronic transaction. The payment authorization request message 522 is transmitted from merchant computing device 516 to payment processor computing device 524 for processing and further transmission to an issuing bank for approval.

Payment processor computing device 524 authenticates 608 the payment authorization request message by determining that the transaction secure token within the payment authorization request message matches the stored registration secure token. If the transaction secure token matches the stored registration secure token, then payment processor computing device 524 embeds a matching indicator into the authorization request message advising the issuer that the received secure token matches the stored secure token, and thus, the transaction has been initially verified as being initiated by the authorized cardholder. If, however, the transaction secure token included within the payment authorization request message does not match the stored secure token at payment processor computing device 524, then payment processor computing device 524 is configured to either (i) embed a "no match" indicator into the authorization request message so that the issuer can decline the transaction for not being a verified cardholder transaction, or (ii) automatically decline the transaction on behalf of the issuer. If the authorization request message is authorized, then payment processor computing device 524 generates and transmits 610 a confirmation response, such as payment authorization response message 526 (shown in FIG. 5), authorizing the transaction to merchant computing device 516.

In some embodiments, payment processor computing device 524 further verifies the payment authorization request message by applying at least one verification rule and determining that the payment authorization request message is a verified message. While in other embodiments, payment processor computing device 524 may receive coupons from merchants and merchant computing device 516 distribute to the cardholder and to be used in any future transactions with the merchant. As such, the payment processor computing device 524 also facilitates transmitting merchant coupons to the cardholder and vehicle computing device 102 for use in future merchant transactions.

In some embodiments, one or more messages sent between the different computer systems, or a portion thereof, are encrypted by the sending device and decrypted by the receiving device. For example, the payment authorization response message may be encrypted by the payment processor computing device and decrypted by the merchant computing device. In one embodiment, the interchange computer system encrypts an account number (e.g., a PAN) and/or secure token using a public key assigned to the merchant, and the merchant computing system decrypts the account number using a private key corresponding to the public key. For example, the private key and the public key may be assigned to the merchant by the interchange network for use in signing documents and/or messages, and may also be used for encrypting messages transmitted between the merchant and the interchange network.

While the invention has been described in terms of various specific embodiments, those skilled in the art recognize that the invention can be practiced with modification within the spirit and scope of the claims.

Exemplary embodiments of methods, systems, and computer-readable storage media for use in implementing an electronic transaction processing system are described above in detail. The methods, systems, and storage media are not limited to the specific embodiments described herein but, rather, operations of the methods and/or components of the system may be utilized independently and separately from other operations and/or components described herein. Further, the described operations and/or components may also be defined in, or used in combination with, other systems, methods, and/or storage media, and are not limited to practice with only the methods, systems, and storage media as described herein.

Computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "card," "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as vehicle computing devices, mobile phones, Smartphones, personal digital assistants (PDAs), key fobs, and/or computers. Each type of transaction card can be used as a method of payment for performing a transaction. In addition, consumer card account behavior can include, but is not limited to, purchases, management activities (e.g., balance checking), bill payments, achievement of targets (meeting account balance goals, paying bills on time), and/or product registrations (e.g., mobile application downloads). The term "transaction card" or "payment card" can also refer to a bank account associated with a user or cardholder that is issued by an issuing bank whether or not a physical card is provided to the cardholder by the issuing bank.

For example, one or more computer-readable storage media may include computer-executable instructions embodied thereon for regulating account-on-file information. In this example, the computing device may include a memory device and a processor in communication with the memory device, and when executed by said processor, the computer-executable instructions may cause the processor to perform a method, such as the methods described and illustrated in the examples of FIG. 6.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Although the present invention is described in connection with an exemplary electronic transaction processing system environment, embodiments of the invention are operational with numerous other general purpose or special purpose electronic transaction processing system environments or configurations. The electronic transaction processing system environment is not intended to suggest any limitation as to the scope of use or functionality of any aspect of the invention. Moreover, the electronic transaction processing system environment should not be interpreted as having any dependency or requirement relating to any one or combination of components illustrated in the exemplary operating environment. Examples of well-known electronic transaction processing systems, environments, and/or configurations that may be suitable for use with the embodiments described herein include, but are not limited to, embedded computing devices, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the described embodiments.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

What is claimed is:

1. A payment processor computing device for performing an electronic transaction initiated by a vehicle including a vehicle computing device, said payment processor computing device comprising one or more processors in communication with one or more memory devices, said payment processor computing device communicatively coupled to the vehicle computing device and to at least one merchant point-of-sale (POS) device, said payment processor computing device configured to:
   receive a registration secure token from a vehicle computing device, the registration secure token being unique to a combination of a cardholder and the vehicle associated with the cardholder and created during a registration process for initiating future electronic transactions, the vehicle computing device coupled to the vehicle, the registration secure token including:
      a tokenized account identifier, the cardholder having an account associated with the account identifier for use in processing electronic transactions;
      a vehicle identifier unique to the vehicle associated with the cardholder; and
      a biometric identifier associated with the cardholder, the biometric identifier generated by the vehicle computing device in response to receiving a first biometric input from a biometric input device connected to the vehicle computing device, wherein the first biometric input is stored in a memory device of the vehicle computing device;
   store the registration secure token in the one or more memory devices;
   receive an authorization request message associated with a payment transaction initiated by the cardholder using the vehicle computing device in communication with a first merchant POS device, the authorization request message sent by the vehicle computing device to said payment processor computing device via the first merchant POS device physically proximate to the vehicle computing device, the authorization request message including transaction data associated with the payment transaction and a transaction secure token, wherein the transaction secure token includes the tokenized account identifier, the vehicle identifier of the vehicle, and the biometric identifier, and wherein the transaction secure token is generated by the vehicle computing device in response to the vehicle computing device receiving a second biometric input from the biometric input device, the second biometric input substantially matching the first biometric input stored in the memory of the vehicle computing device;
   authenticate the authorization request message by matching the transaction secure token to the registration secure token, the matching including (i) matching a first portion of the transaction secure token representing the tokenized account identifier and a second portion of the transaction secure token representing the vehicle identifier to a first portion of the registration secure token representing the tokenized account identifier and a second portion of the registration secure token representing the vehicle identifier to verify the payment account being used to initiate the payment transaction via the vehicle computing device is associated with the vehicle associated with the vehicle identifier and that the vehicle associated with the vehicle identifier is in proximity to the first merchant POS device at the time the payment transaction is initiated, and (ii) matching a third portion of the transaction secure token representing the biometric identifier to a third portion of the registration secure token representing the biometric identifier to verify a registered cardholder is initiating the payment transaction;
   embed a matching indicator within the authorization request message, the matching indicator representing successful verification of the payment transaction based upon successful matching of the transaction secure token with the registration secure token; and
   transmit the authorization request message with the embedded matching indicator to an issuer of the account for further processing, wherein, upon detection of the embedded matching indicator by the issuer, the embedded matching indicator is configured to indicate initial verification of the payment transaction has been performed by the payment processing computer device and cause expedited issuer authentication and authorization of the payment transaction.

2. The payment processor computing device of claim 1, wherein said payment processor computing device is further configured to receive the registration secure token in response to the cardholder inputting the account identifier and the vehicle identifier during the registration process.

3. The payment processor computing device of claim 1, wherein the first biometric input includes at least one of a fingerprint image, a voice recording, and a retinal image of the cardholder.

4. The payment processor computing device of claim 1, wherein said payment processor computing device is further configured to verify the authorization request message by applying at least one verification rule and determining that the authorization request message is a verified message.

5. The payment processor computing device of claim 4, wherein the at least one verification rule for determining that the authorization request message is verified includes at least one of: (i) determining that a current location of the vehicle corresponds to a location of the first merchant POS device based on a vehicle location received from the first merchant POS device in the authorization request message; and (ii) determining that a current mileage of the vehicle is greater than a previous mileage of the vehicle when performing a previous transaction based on a vehicle mileage received from the first merchant POS device in the authorization request message.

6. The payment processor computing device of claim 1, wherein said payment processor computing device is further configured to transmit at least one coupon to the vehicle computing device based on prior transactions.

7. The payment processor computing device of claim 1, wherein said payment processor computing device is further configured to receive a plurality of registration secure tokens from the vehicle computing device, each of the plurality of registration secure tokens unique to a respective combination of another cardholder of a plurality of cardholders linked to the vehicle and the vehicle.

8. The payment processor computing device of claim 1, wherein the vehicle identifier is a vehicle identification number (VIN) associated with the vehicle by a vehicle manufacturer.

9. The payment processor computing device of claim 1, said payment processor computing device further configured to:
   determine that the transaction secure token does not match the registration secure token;
   embed a no-match indicator within the authorization request message; and transmit the authorization request message with the embedded no-match indicator to an issuer of the account for further processing, wherein, upon detection of the embedded no-match indicator by the issuer, the embedded no-match indicator is configured to indicate initial verification of the payment transaction performed by the payment processing computer device was unsuccessful and cause the issuer to (i) initiate one or more additional authentication procedures, or (ii) decline the payment transaction.

10. The payment processor computing device of claim 1, said payment processor computing device further configured to:
  determine that the transaction secure token does not match the registration secure token;
  generate, on behalf of the issuer, an authorization response message including a decline message and a no-match indicator; and
  transmit the authorization response message including the embedded no-match indicator to the merchant computing device to terminate the electronic transaction.

11. A computer-implemented method for performing an electronic transaction initiated by a vehicle including a vehicle computing device coupled to the vehicle, said method implemented using a payment processor computing device communicatively coupled to the vehicle computing device and to at least one merchant point-of-sale (POS) device, the vehicle computing device and the payment processor computing device each having at least one processor and one or more memory devices, said method comprising:
  generating, by the vehicle computing device, a biometric identifier associated with a cardholder in response to receiving a first biometric input from a biometric input device connected to the vehicle computing device, wherein the first biometric input is stored in the one or more memory devices of the vehicle computing device;
  receiving, by the payment processor computing device, a registration secure token from the vehicle computing device, the registration secure token being unique to a combination of the cardholder the vehicle associated with the cardholder and created during a registration process for initiating future electronic transactions, the registration secure token including a tokenized account identifier, a vehicle identifier unique to the vehicle associated with the cardholder, and the biometric identifier, the cardholder having an account associated with the account identifier for use in processing electronic transactions, and the cardholder being associated with the biometric identifier;
  storing, by the payment processor computing device, the registration secure token in the one or more memory devices;
  receiving, by the payment processor computing device, an authorization request message associated with a payment transaction initiated by the cardholder using the vehicle computing device in communication with first merchant POS device, the authorization request message sent by the vehicle computing device to the payment processor computing device via the first merchant POS device physically proximate to the vehicle computing device, the authorization request message including transaction data associated with the payment transaction and a transaction secure token that includes the tokenized account identifier, the vehicle identifier of the vehicle, and the biometric identifier, wherein the transaction secure token is generated by the vehicle computing device in response to the vehicle computing device receiving a second biometric input from the biometric input device, the second biometric input substantially matching the first biometric input stored in the one or more memory devices of the vehicle computing device;
  authenticating, by the payment processor computing device, the authorization request message by matching the transaction secure token to the registration secure token, said matching including (i) matching a first portion of the transaction secure token representing the tokenized account identifier and a second portion of the transaction secure token representing the vehicle identifier to a first portion of the registration secure token representing the tokenized account identifier and a second portion of the registration secure token representing the vehicle identifier to verify the payment account being used to initiate the payment transaction via the vehicle computing device is associated with the vehicle associated with the vehicle identifier and that the vehicle associated with the vehicle identifier is in proximity to the first merchant POS device at the time the payment transaction is initiated, and (ii) matching a third portion of the transaction secure token representing the biometric identifier to a third portion of the registration secure token representing the biometric identifier to verify a registered cardholder is initiating the payment transaction;
  embedding a matching indicator within the authorization request message, the matching indicator representing successful verification of the payment transaction based upon successful matching of the transaction secure token with the registration secure token; and
  transmitting the authorization request message with the embedded matching indicator to an issuer of the account for further processing, wherein, upon detection of the embedded matching indicator by the issuer, the embedded matching indicator is configured to indicate initial verification of the payment transaction has been performed by the payment processing computer device and cause expedited issuer authentication and authorization of the payment transaction.

12. The method of claim 11, wherein receiving a registration secure token further comprises receiving the registration secure token in response to the cardholder inputting the account identifier and the vehicle identifier during the registration process.

13. The method of claim 11, wherein the first biometric input includes at least one of a fingerprint image, a voice recording, and a retinal image of the cardholder.

14. The method of claim 11 further comprising verifying the authorization request message, by the payment processor computing device, by applying at least one verification rule and determining that the authorization request message is a verified message.

15. The method of claim 14, wherein the at least one verification rule for determining that the authorization request message is verified includes at least one of: (i) determining that a current location of the vehicle corresponds to a location of first merchant POS device based on a vehicle location received from the first merchant POS device in the authorization request message; and (ii) determining that a current mileage of the vehicle is greater than a previous mileage of the vehicle corresponding to a previous transaction based on a vehicle mileage received from the first merchant POS device in the authorization request message.

16. The method of claim 11 further comprising transmitting at least one coupon from the payment processor computing device to the vehicle computing device based on prior transactions.

17. The method of claim 11 further comprising receiving at the payment processor computing device a plurality of registration secure tokens from the vehicle computing device, each of the plurality of registration secure tokens unique to a respective combination of another cardholder of a plurality of cardholders linked to the vehicle and the vehicle.

18. A non-transitory computer readable medium that includes computer executable instructions for performing an electronic transaction initiated by a vehicle including a vehicle computing device using a payment processor computing device in communication with a payment network and the vehicle computing device and to at least one merchant point-of-sale (POS) device, wherein when executed by the payment processor computing device, the computer executable instructions cause the payment processor computing device to:

receive a registration secure token from a vehicle computing device, the registration secure token being unique to a combination of a cardholder and the vehicle associated with the cardholder and created during a registration process for initiating future electronic transactions, the vehicle computing device coupled to the vehicle, the registration secure token including:
 a tokenized account identifier, the cardholder having an account associated with the account identifier for use in processing electronic transactions;
 a vehicle identifier unique to the vehicle associated with the cardholder; and
 a biometric identifier associated with the cardholder, the biometric identifier generated by the vehicle computing device in response to receiving a first biometric input from a biometric input device connected to the vehicle computing device, wherein the first biometric input is stored in a memory device of the vehicle computing device;

store the registration secure token in the one or more memory devices;

receive an authorization request message associated with a payment transaction initiated by the cardholder using the vehicle computing device in communication with a first merchant POS device, the authorization request message sent by the vehicle computing device to said payment processor computing device via the first merchant POS device physically proximate to the vehicle computing device, the authorization request message including transaction data associated with the payment transaction and a transaction secure token, wherein the transaction secure token includes the tokenized account identifier, the vehicle identifier of the vehicle, and the biometric identifier, and wherein the transaction secure token is generated by the vehicle computing device in response to the vehicle computing device receiving a second biometric input from the biometric input device, the second biometric input substantially matching the first biometric input stored in the memory of the vehicle computing device;

authenticate the authorization request message by matching the transaction secure token to the registration secure token, the matching including (i) matching a first portion of the transaction secure token representing the tokenized account identifier and a second portion of the transaction secure token representing the vehicle identifier to a first portion of the registration secure token representing the tokenized account identifier and a second portion of the registration secure token representing the vehicle identifier to verify the payment account being used to initiate the payment transaction via the vehicle computing device is associated with the vehicle associated with the vehicle identifier and that the vehicle associated with the vehicle identifier is in proximity to the first merchant POS device at the time the payment transaction is initiated, and (ii) matching a third portion of the transaction secure token representing the biometric identifier to a third portion of the registration secure token representing the biometric identifier to verify a registered cardholder is initiating the payment transaction;

embed a matching indicator within the authorization request message, the matching indicator representing successful verification of the payment transaction based upon successful matching of the transaction secure token with the registration secure token; and transmit the authorization request message with the embedded matching indicator to an issuer of the account for further processing wherein, upon detection of the embedded matching indicator by the issuer, the embedded matching indicator is configured to indicate initial verification of the payment transaction has been performed by the payment processing computer device and cause expedited issuer authentication and authorization of the payment transaction.

19. The non-transitory computer readable medium of claim 18, wherein the computer executable instructions cause the payment processor computing device to receive the registration secure token in response to the cardholder inputting the account identifier and the vehicle identifier during the registration process.

20. The non-transitory computer readable medium of claim 18, wherein the computer executable instructions cause the payment processor computing device to verify the authorization request message by applying at least one verification rule and determining that the authorization request message is a verified message.

21. The non-transitory computer readable medium of claim 18, wherein the computer executable instructions cause the payment processor computing device to transmit at least one coupon to the vehicle computing device based on prior transactions.

* * * * *